United States Patent
Lin (10) Patent No.: US 10,094,998 B2
(45) Date of Patent: Oct. 9, 2018

(54) STRUCTURE FOR DIRECTLY LEADING DOWN OPTICAL UNIT OF OPPC OPTICAL FIBER CABLE AND CONSTRUCTION METHOD THEREFOR

(71) Applicant: Yang Lin, Guangzhou (CN)

(72) Inventor: Yang Lin, Guangzhou (CN)

( * ) Notice: Subject to any disclaimer, the term of this patent is extended or adjusted under 35 U.S.C. 154(b) by 0 days.

(21) Appl. No.: 15/626,107

(22) Filed: Jun. 17, 2017

(65) Prior Publication Data
US 2018/0059353 A1 Mar. 1, 2018

(30) Foreign Application Priority Data
Aug. 29, 2016 (CN) .......................... 2016 1 0753396

(51) Int. Cl.
*G02B 6/44* (2006.01)
*H01B 9/00* (2006.01)
(52) U.S. Cl.
CPC ......... *G02B 6/4459* (2013.01); *G02B 6/4422* (2013.01); *H01B 9/008* (2013.01)
(58) Field of Classification Search
CPC ..... G02B 6/4459; G02B 6/4422; H01B 9/008

USPC .......................................................... 385/136
See application file for complete search history.

(56) References Cited

U.S. PATENT DOCUMENTS 8,406,590 B2 * 3/2013 Casals ................. G02B 6/4484
166/380

* cited by examiner

*Primary Examiner* — Jerry Blevins
(74) *Attorney, Agent, or Firm* — Wayne & Ken, LLC; Tony Hom (57) ABSTRACT

A structure for directly leading down the optical unit (OU) from the OPPC (optical phase conductor) cable, by the OU leading-down connector (2) invented recently, is used for separating the plastic-pipe OU from the OPPC cable installed on the tower, avoiding the splicing of fibers on the tower of the old technique. Therefore it is possible to assemble the OPPC cable (1), the OU leading-down connector (2), the preformed armor rod assembly (3), the first link fitting (4), the residual cable rack (5), the second link fitting (6), the insulator string (7) on the ground all together. Then the whole assemble can be erected on to the tower. Just as the conventional overhead power line construction. So it is simple and saving in work.

9 Claims, 11 Drawing Sheets

STRUCTURE FOR DIRECTLY LEADING DOWN OPTICAL UNIT OF OPPC OPTICAL FIBER CABLE AND CONSTRUCTION METHOD THEREFOR

RELATED APPLICATIONS

The present application claims priority to Chinese Application Number 201610753396.6, filed Aug. 29, 2016, the disclosure of which is hereby incorporated by reference herein in its entirety.

TECHNICAL FIELD

The present invention relates to a structure for directly leading down optical units of an OPPC optical fiber cable and a construction method therefor.

BACKGROUND

In an optical phase conductor (hereinafter referred to as OPPC), optical units are recombined into the phase conductor, so that optical signals may be transmitted while electric energy is transmitted, and an optical signal transmission link may be established along the road while a power transmission line is erected, to achieve the purpose of using a single material for two functions, thereby saving materials and saving labor.

In 2009, Guangdong Power Grid Corporation developed a novel technology for separating and leading down OPPC optical units. Such novel technology avoids two problems in the original OPPC construction: the first problem is about how to order distribution boards with fixed length according to interface position and distance; and the second problem is about how to install a junction device of high-voltage insulation against ground on a tower to connect the optical unit with a section of fully insulated ordinary fiber optic cable.

The novel construction technology solves the problems of the traditional construction method. The field application result indicates that the novel construction technology not only can avoid distribution boards with fixed cable length and ascending a height for fusion, but also can use conventional lines to connect fittings.

In 2014, Guangdong Power Grid Corporation redeveloped a novel technology for directly leading down plastic-pipe optical units following the photoelectric separation principle in 2009. Through a series of calculations and experiments, on November 14 of the same year, a 110 kV Kaigang line of hangmen Power Supply Bureau is erected, and is put into operation.

The OPPC of a plastic-pipe optical unit makes the problem of high-voltage insulation of a led down section to be easily solved and the manufacturing costs of optical units to be substantially reduced, so that construction becomes more convenient.

However, at present, the achieved technology of separating and leading down OPPC optical units also has certain limitations:

The first limitation is that for a general OPPC optical fiber cable, an optical unit is placed on the internal layer. From the angle of strengthening protection of the optical unit, it is reasonable. However, when the optical unit separation sleeve developed in 2009 is assembled, the optical unit is required to be placed on the secondary external layer.

The second limitation is that when the recombination optical fiber cable comprises two optical units, the two optical units are both required to be separated and led down, causing great difficulty.

The third limitation is that a strain fitting is installed on the cable section of the optical unit separated, thereby being not beneficial to coiling the residual cable for future maintenance.

To accelerate implementation of smart grid, the state already requires that the communication link automatically controlled by the Grid should be synchronously constructed while constructing a 10 Kv distribution line. Therefore, there is a need to continue to overcome the defect existing in the photoelectric separation technology in 2009, in order to quickly promote the goal of photoelectric synchronous construction of the distribution lines.

SUMMARY

The technical problem to be solved by the present invention is to provide a structure for directly leading down optical units of an OPPC optical fiber cable and a construction method therefor.

To solve the above-mentioned technical problem, the present invention adopts the following technical solutions:

A structure for directly leading down optical units of an OPPC optical fiber cable, provided with an OPPC optical fiber cable, a preformed armor rod assembly, a first link fitting, a second link fitting, an insulator string and an electric connection jumper, wherein the preformed armor rod assembly is installed on the OPPC optical fiber cable, the preformed armor rod assembly is connected to one end of the insulator string through the first link fitting and the second link fitting in sequence, the other end of the insulator string is connected to a cross arm of a pylon or a telegraph pole, and the electric connection jumper is installed on the OPPC optical fiber cable, wherein the OPPC optical fiber cable is formed by intertwisting a plastic-pipe optical unit, a plurality of steel wires and a plurality of aluminum wires; and characterized by being further provided with an optical unit leading-out connector;

the optical unit leading-out connector is provided with a base, an upper cover, a leading-out pipe and an insulating sealing assembly, wherein the base is of a special-shaped pipe body provided with a cover opening and a leading-out hole, the base is divided into a recombination section, a separation section and a recovery section in sequence in the axial direction, the cover opening is provided at the pipe wall top of the base, penetrates through the recombination section and the separation section and covers part of the recovery section, the leading-out hole is provided at the pipe wall bottom of the base and is located in the separation section, the leading-out pipe is of a special-shaped pipe body provided with a different-diameter pipe chamber, the different-diameter pipe chamber is formed by connecting a first pipe chamber, a second pipe chamber and a third pipe chamber in sequence, the second pipe chamber is a hemispherical pipe chamber, external threads are provided at the end of the leading-out pipe located at one side of the third pipe chamber, the insulating sealing assembly is provided with a spherical sealing washer, an insulating sheath, a reinforcing sleeve and a tightening nut, the insulating sheath is of a variable-diameter pipe body provided with a hemispherical pipe chamber and a main pipe chamber and formed by connecting a large-diameter pipe part and a small-diameter pipe part, the hemispherical pipe chamber is located at the end of the large-diameter pipe part, the main pipe chamber penetrates through the small-diameter pipe part and is connected to the hemispherical pipe chamber, an external wall of the reinforcing sleeve located at one end is provided with an external lug boss, an internal wall of the tightening nut located at one end is provided with an internal lug boss; and the leading-out pipe is connected to the base, so that the first pipe chamber is in communication with the pipe chamber of the base through the leading-out hole;

an optical fiber cable section of the OPPC optical fiber cable located at the tail is divided into a reservation strand the plastic-pipe optical unit by stripping an external layer strand covering the plastic-pipe optical unit, and the cut end of the reservation strand is formed into a strand section with a length of ΔL greater than the length sum of the separation section and the recovery section, where ΔL is between 1 cm and 2 cm;

the separated plastic-pipe optical unit stretches into the different-diameter pipe chamber of the leading-out pipe through the leading-out hole, the reservation strand penetrates into the pipe chamber of the base, and the end with the length of ΔL of the recovery section cable stretches out of the base, so that the left end of the reservation strand is located on the separation section, then, a soft aluminum pipe of which the external diameter corresponds to the pipe chamber and the internal diameter corresponds to the reserve strand is sleeved, a space left by the recovery section (D3) is filled to form a complete recovery section cable, moreover, the end of the base located at one side of the recovery section is tightly pressed on the recovery section cable by a hydraulic clamp, the plastic-pipe optical unit stretching into the different-diameter pipe chamber of the leading-out pipe is led out by the insulating sealing assembly, and the upper cover covers the cover opening;

wherein the plastic-pipe optical unit stretching into the different-diameter pipe chamber of the leading-out pipe is led out by the insulating sealing assembly in the following installation mode: the spherical sealing washer and the large-diameter pipe part of the insulating sheath are installed in the second pipe chamber and the third pipe chamber in sequence, so that the spherical sealing washer is located in a spherical chamber body formed by the second pipe chamber and the hemispherical pipe chamber and the first pipe chamber is in communication with the main pipe chamber through a central through hole of the spherical sealing washer; the plastic-pipe optical unit stretching into the different-diameter pipe chamber of the leading-out pipe penetrates through the central through hole of the spherical sealing washer and the main pipe chamber; the reinforcing sleeve is sleeved on the small-diameter pipe part, and the external lug boss is located on the large-diameter pipe part; the tightening nut is sleeved on the reinforcing sleeve and is connected to the external threads, so that the internal lug boss of the tightening nut tightly presses the spherical sealing washer in the spherical chamber body formed by the second pipe chamber and the hemispherical pipe chamber through the external lug boss and the large-diameter pipe part in sequence, and enables the spherical sealing washer to be tightly pressed on the plastic-pipe optical unit.

In an improved embodiment of the present invention, the OPPC optical fiber cable is provided with two plastic-pipe optical units; the optical unit leading-out connector is provided with two leading-out pipes and two insulating sealing assemblies, the upper cover is provided with an upper cover leading-out hole, and the upper cover leading-out hole is located in the recombination section when the upper cover covers the cover opening; the first leading-out pipe is connected to the base, so that the first pipe chamber of the first leading-out pipe is in communication with the pipe chamber of the base through the leading-out hole, the second leading-out pipe is connected to the external wall of the upper cover, so that the first pipe chamber of the second leading-out pipe is in communication with the pipe chamber of the base through the upper cover leading-out hole; the two plastic-pipe optical units are both separated from the reservation strand by stripping the external layer strand, the first separated plastic-pipe optical unit stretches into the different-diameter pipe chamber of the leading-out pipe connected to the base through the leading-out hole and is led out by the first insulating sealing assembly, and the second separated plastic-pipe optical unit stretches into the different-diameter pipe chamber of the leading-out pipe connected to the upper cover through the upper cover leading-out hole and is led out by the second insulating sealing assembly.

To facilitate leading out the plastic-pipe optical unit, in a preferred embodiment of the present invention, the leading-out pipe in the axial direction from the first pipe chamber to the third pipe chamber makes an acute included angle with the leading-out pipe in the axial direction from the recombination section to the recovery section.

To facilitate stretching the plastic-pipe optical unit into the different-diameter pipe chamber of the leading-out pipe, in a preferred embodiment of the present invention, the first pipe chamber is a frustum-shaped pipe chamber of which the pipe diameter gradually decreases in the axial direction from the first pipe chamber to the third pipe chamber.

To guarantee the strength of the optical unit leading-out connector, in a preferred embodiment of the present invention, a triangular reinforcing part is connected between the base and the extended leading-out pipe, and the base, the leading-out pipe and the triangular reinforcing part are integrated in one piece.

To guarantee the strength of the optical unit leading-out connector, in a preferred embodiment of the present invention, the upper cover covering the cover opening is connected and fixed to the base by bolts.

In an improved embodiment of the present invention, the OPPC optical fiber cable leaves a residual cable section for maintenance between the installation position of the preformed armor rod assembly and the installation position of the optical unit leading-out connector; the structure for directly leading down optical units is further provided with a residual cable rack; the residual cable rack is connected between the first link fitting and the second link fitting; and the residual cable section is coiled on the residual cable rack.

In a preferred embodiment of the present invention, the residual cable rack is composed of a horizontal pull rod and a vertical pull rod of which the upper end is fixed to the middle part of the horizontal pull rod, the horizontal pull rod and the vertical pull rod are provided with lugs respectively, the horizontal pull rod is connected between the first link fitting and the second link fitting, and the residual cable section is coiled on the residual cable rack through the lugs.

A construction method for a structure for directly leading down optical units of an OPPC optical fiber cable, characterized in that the structure for directly leading down optical units is the above structure for directly leading down optical units, and the construction method comprising:

Step 1. on the ground, connecting the OPPC optical fiber cable to the optical unit leading-out connector, comprising:

Step 1-1. making the optical fiber cable section of the OPPC optical fiber cable located at the tail into the reservation strand the separated plastic-pipe optical unit;

Step 1-2. stretching the separated plastic-pipe optical unit into the different-diameter pipe chamber of the leading-out pipe first, penetrating the reservation strand into the pipe chamber of the base, at the ΔL end, sleeving a soft aluminum pipe of which the external diameter corresponds to the pipe chamber and the internal diameter corresponds to the reservation strand and the left space, filling the space left by the recovery section (D3) to form a complete recovery section cable, enabling the upper cover to cover the cover opening of the base, and tightly pressing the end of the base located at one side of the recovery section on the recovery section cable using a hydraulic clamp;

Step 1-3. leading out the plastic-pipe optical unit stretching into the different-diameter pipe chamber of the leading-out pipe by the insulating sealing assembly, and temporarily coiling the plastic-pipe optical unit led out by the insulating sealing assembly, wherein the plastic-pipe optical unit led out by the insulating sealing assembly stretches into the different-diameter pipe chamber of the leading-out pipe and then penetrates through the central through hole of the spherical sealing washer and the main pipe chamber of the insulating sheath;

Step 2. on the ground, installing the preformed armor rod assembly and the electric connection jumper on the OPPC optical fiber cable, wherein the OPPC optical fiber cable leaves a residual cable section for maintenance between the installation position of the preformed armor rod assembly and the installation position of the optical unit leading-out connector;

Step 3. on the ground, connecting the preformed armor rod assembly to one end of the insulator string through the first link fitting, the residual cable rack and the second link fitting in sequence, and coiling the residual cable section on the residual cable rack;

Step 4. slinging the other end of the insulator string and connecting same to a cross arm of a pylon or a telegraph pole, to pull the OPPC optical fiber cable, the preformed armor rod assembly, the first link fitting, the residual cable rack, the second link fitting, the insulator string and the electric connection jumper into the air; and Step 5. uncoiling the temporarily coiled plastic-pipe optical unit and fixing same to the pylon or the telegraph pole, to directly lead down the plastic-pipe optical unit of the OPPC optical fiber cable.

Compared with the prior art, the present invention has the following beneficial effects:

First, the structure for directly leading down optical units of the present invention may separate a plastic-pipe optical unit of an OPPC optical fiber cable hanging in the air and directly lead down same, and may be suitable for an OPPC optical fiber cable of which the plastic-pipe optical unit is installed at any position in the OPPC optical fiber cable, thereby avoiding the limitation problem that the existing technology for separating and leading down OPPC optical units is only suitable for an OPPC optical fiber cable of which the optical unit is located on the secondary external layer;

Second, the optical unit leading-out connector of the present invention may achieve separation and direct lead down of the plastic-pipe optical unit of the OPPC optical fiber cable including two plastic-pipe optical units by adding one insulating sealing assembly and one leading-out pipe connected to the upper cover;

Third, the structure for directly leading down optical units of the present invention may coil the residual cable section for maintenance left by the OPPC optical fiber cable in the air through the residual cable rack, thereby keeping certain convenience for later accident handling or repair and maintenance;

Fourth, the construction method for a structure for directly leading down optical units of the present invention includes: "on the ground, connecting an OPPC optical fiber cable to an optical unit leading-out connector, connecting and installing a preformed armor rod assembly, a first link fitting, a residual cable rack, a second link fitting and an insulator string, and coiling a residual cable section", and then pulling same into the air to connect same to a cross arm of a pylon or a telegraph pole, so as to directly lead down the plastic-pipe optical unit. Therefore, the present invention can avoid the problems of inconvenient construction and difficult quality testing existing in the conventional construction method for a structure for directly leading down optical units when construction is conducted in the air where the pylon or the telegraph pole is located, and has the advantage of simple and convenient of construction.

DESCRIPTION OF THE DRAWINGS

The present invention will be further described in detail in combination with the figures and specific embodiments.

FIG. 1-1 is a structural explosive view showing a main section of an optical unit leading-out connector of embodiment 1 of the present invention;

FIG. 1-2 is a left view showing an optical unit leading-out connector of embodiment 1 of the present invention;

FIG. 1-3 is a top view showing an upper cover in an optical unit leading-out connector of embodiment 1 of the present invention;

FIG. 5-1 is a structural explosive view showing a main section of an optical unit leading-out connector of embodiment 2 of the present invention;

FIG. 5-2 is a left view showing an optical unit leading-out connector of embodiment 2 of the present invention;

FIG. 5-3 is a top view showing an upper cover in an optical unit leading-out connector of embodiment 2 of the present invention;

DETAILED DESCRIPTION

Embodiment 1

Figure 2:
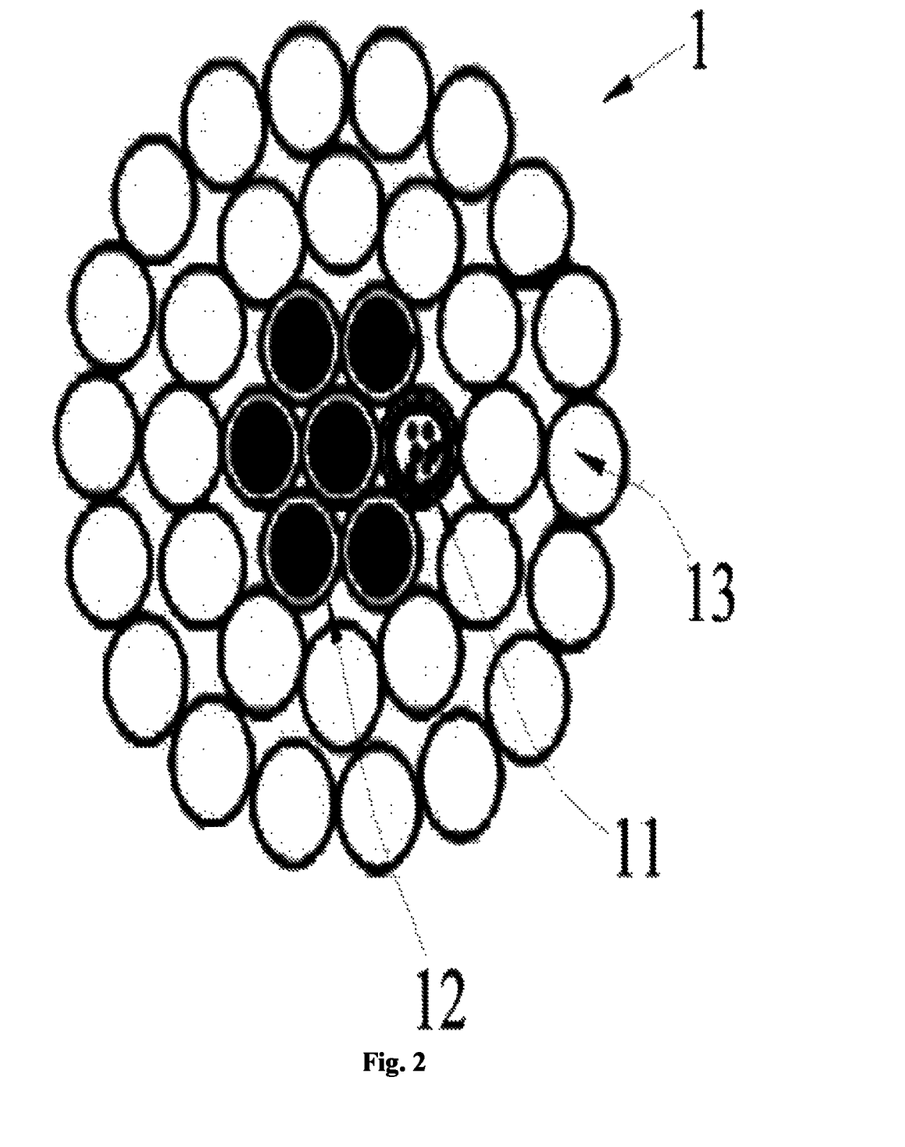
FIG. 2 is a structural schematic diagram showing a section of an OPPC optical fiber cable.
Figure 3:
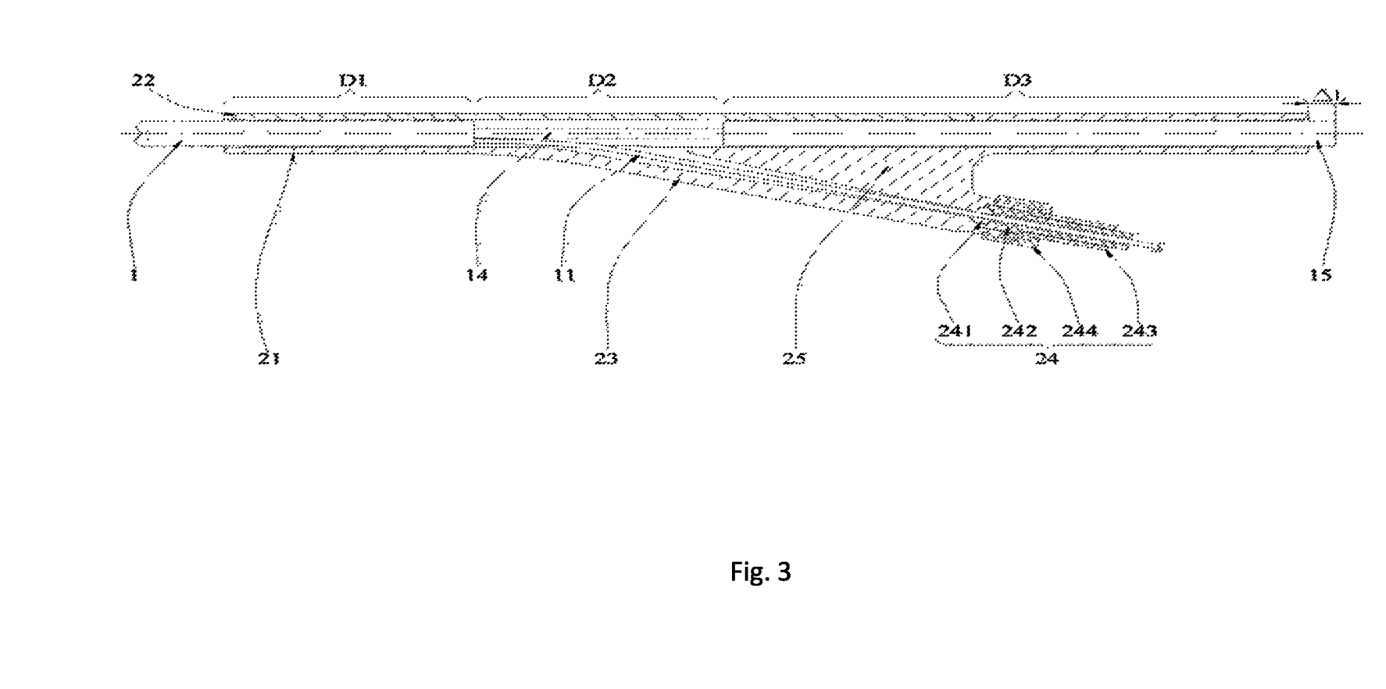
FIG. 3 is a structural schematic diagram showing a main section of an optical unit leading-out connector installed on an OPPC optical fiber cable of embodiment 1 of the present invention.
Figure 4:
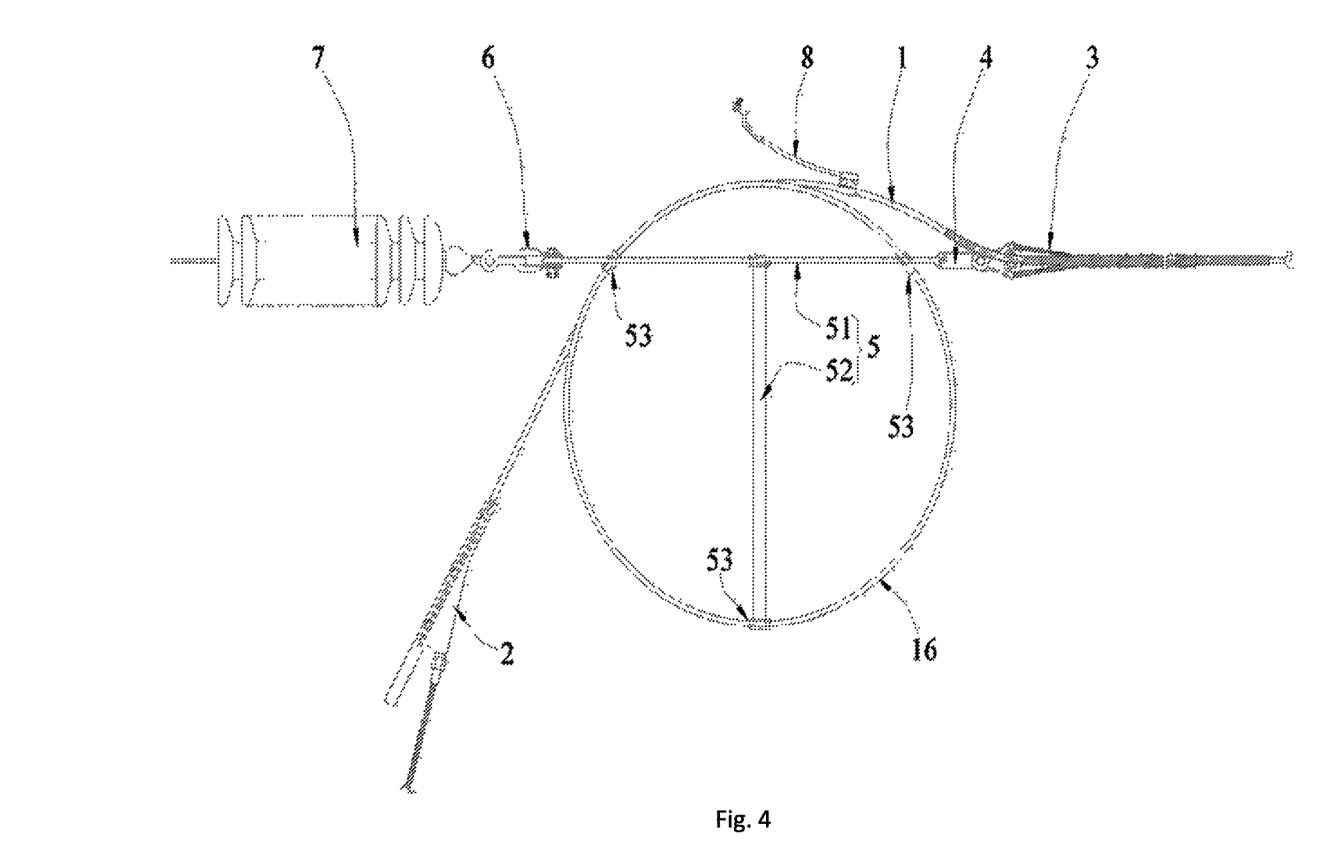
FIG. 4 is a structural schematic diagram showing a main section of a structure for directly leading down optical units of an optical unit leading-out connector of embodiment 1 of the present invention.

As shown in FIG. 1-1 to FIG. 4, the structure for directly leading down optical units of an OPPC optical fiber cable of embodiment 1 of the present invention is provided with an OPPC optical fiber cable 1, an optical unit leading-out connector 2, a preformed armor rod assembly 3, a first link fitting 4, a residual cable rack 5, a second link fitting 6, an insulator string 7 and an electric connection jumper 8, wherein the residual cable rack 5 is composed of a horizontal pull rod 51 and a vertical pull rod 52 of which the upper end is fixed to the middle part of the horizontal pull rod 51, and the horizontal pull rod 51 and the vertical pull rod 52 are provided with lugs 53 respectively.

The preformed armor rod assembly 3 is installed on the OPPC optical fiber cable 1, the preformed armor rod assembly 3 is connected to one end of the insulator string 7 through the first link fitting 4, the horizontal pull rod 51 of the residual cable rack 5 and the second link fitting 6 in sequence, the other end of the insulator string 7 is connected to a cross arm of a pylon or a telegraph pole, and the electric connection jumper 8 is installed on the OPPC optical fiber cable 1, wherein the OPPC optical fiber cable 1 is formed by intertwisting a plastic-pipe optical unit 11, a plurality of steel wires 12 and a plurality of aluminum wires 13, and the plastic-pipe optical unit 11 is an optical unit sleeved with an insulating material sleeve (i.e. the plastic pipe) which can isolate high voltage; both ends of the OPPC optical fiber cable 1 are connected to the cross arms of two pylons (or telegraph poles) through two preformed armor rod assemblies 3, the first link fitting 4, the second link fitting 6 and the insulator string 7 respectively, the installation position of each preformed armor rod assembly 3 on the OPPC optical fiber cable 1 is determined by the sag degree of the OPPC optical fiber cable 1, the preformed armor rod assembly 3, the first link fitting 4, the second link fitting 6 and the insulator string 7 after being connected to the cross arms of the pylons or the telegraph poles, i.e. the step of adjusting the arc sag in the conventional construction of the OPPC optical fiber cable.

Figure 11:
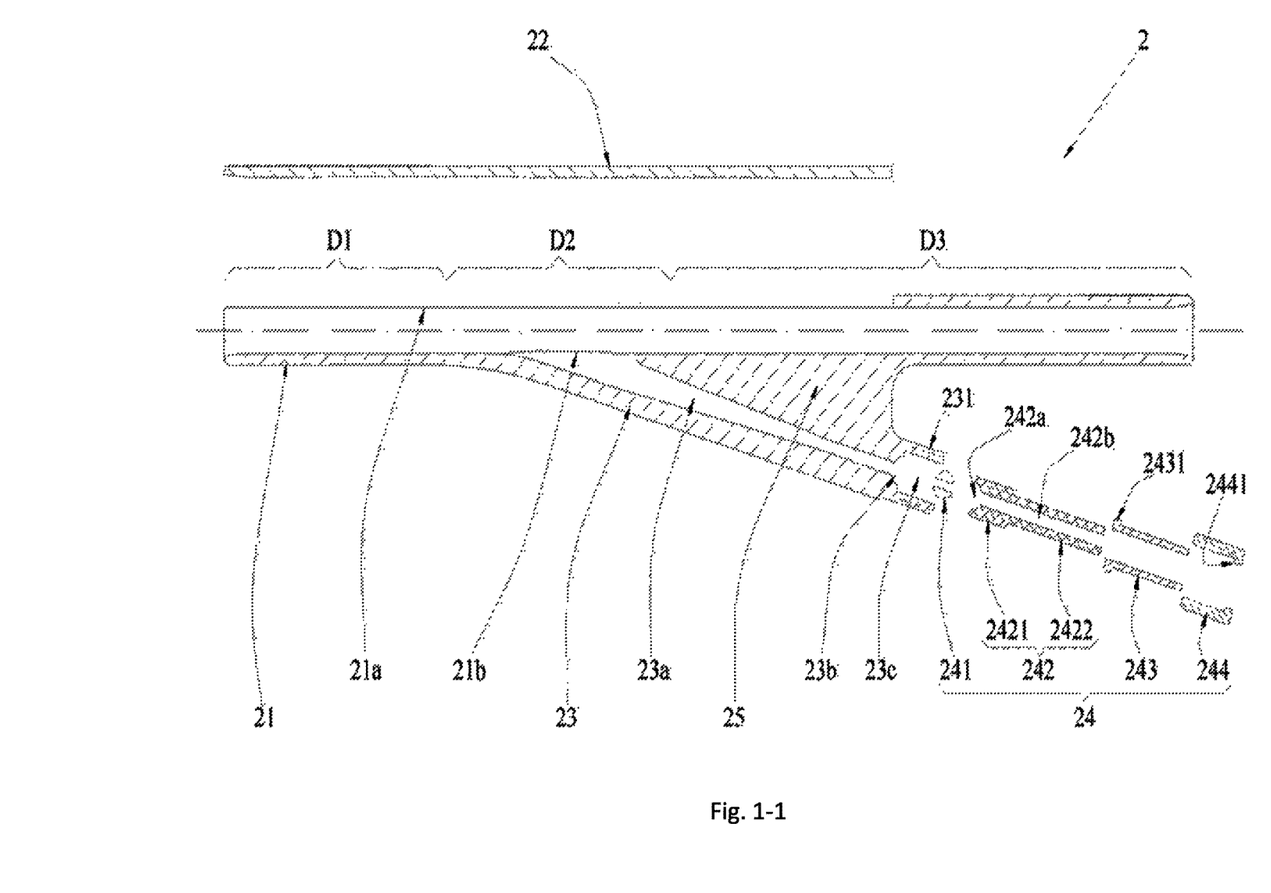
Figure 12:
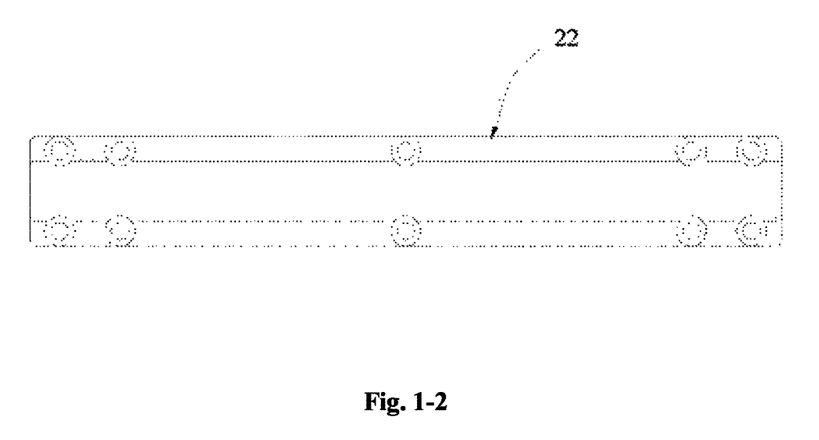
Figure 13:
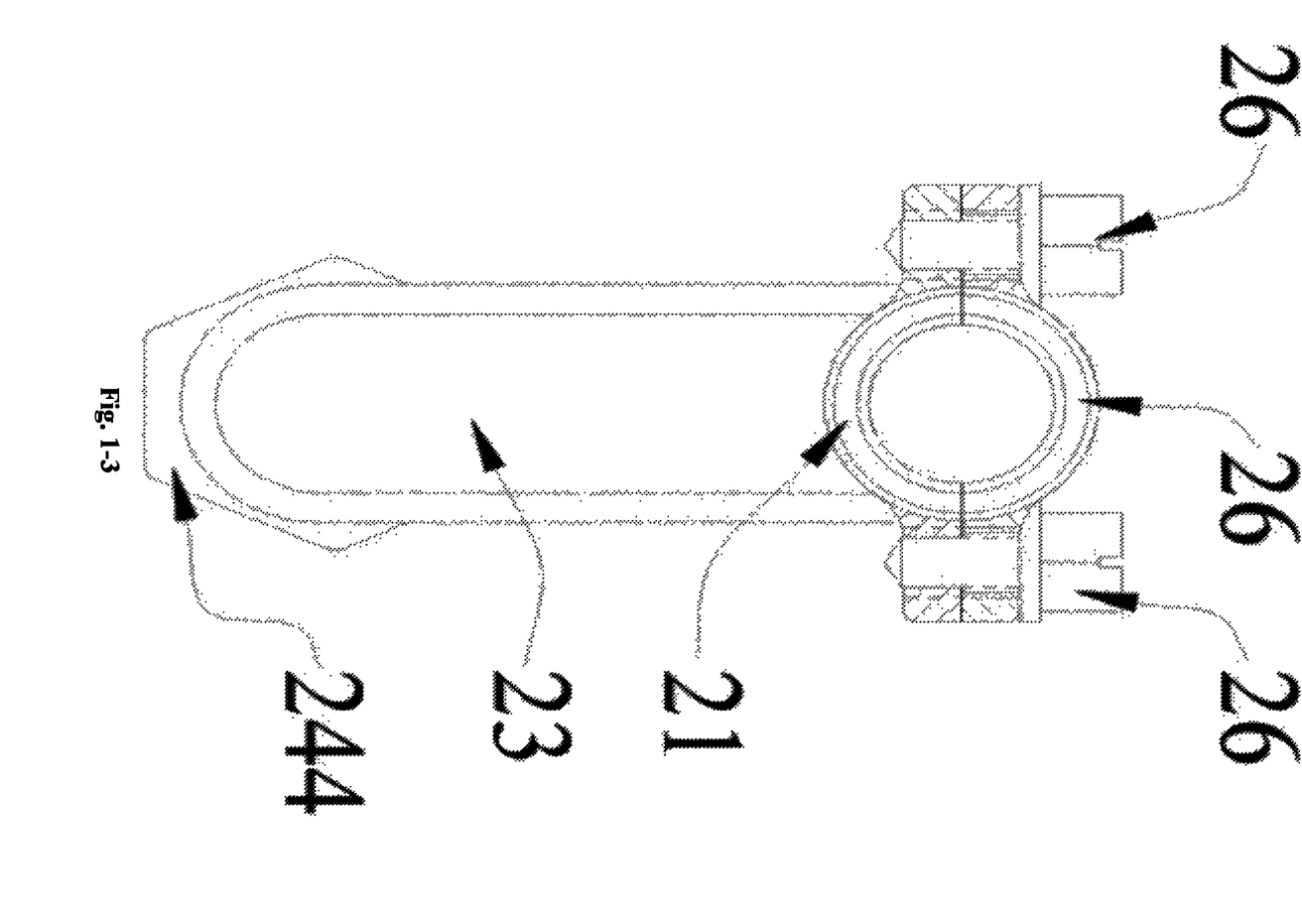
Figure 51:
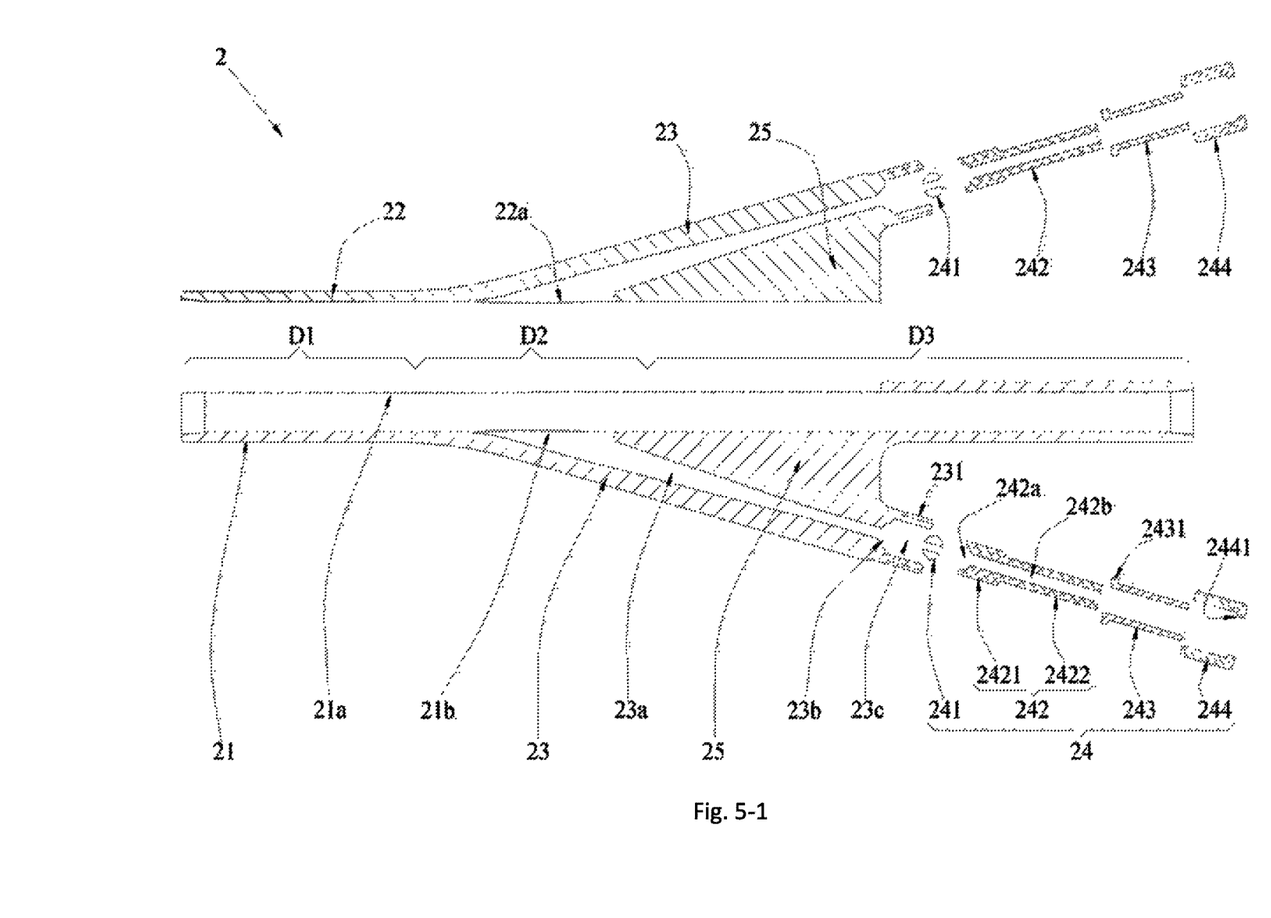
Figure 52:
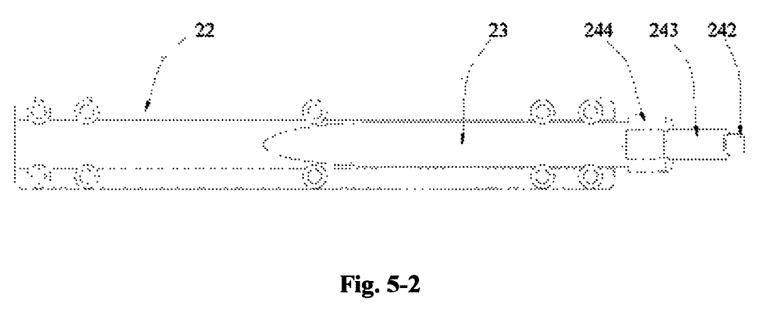
Figure 53:
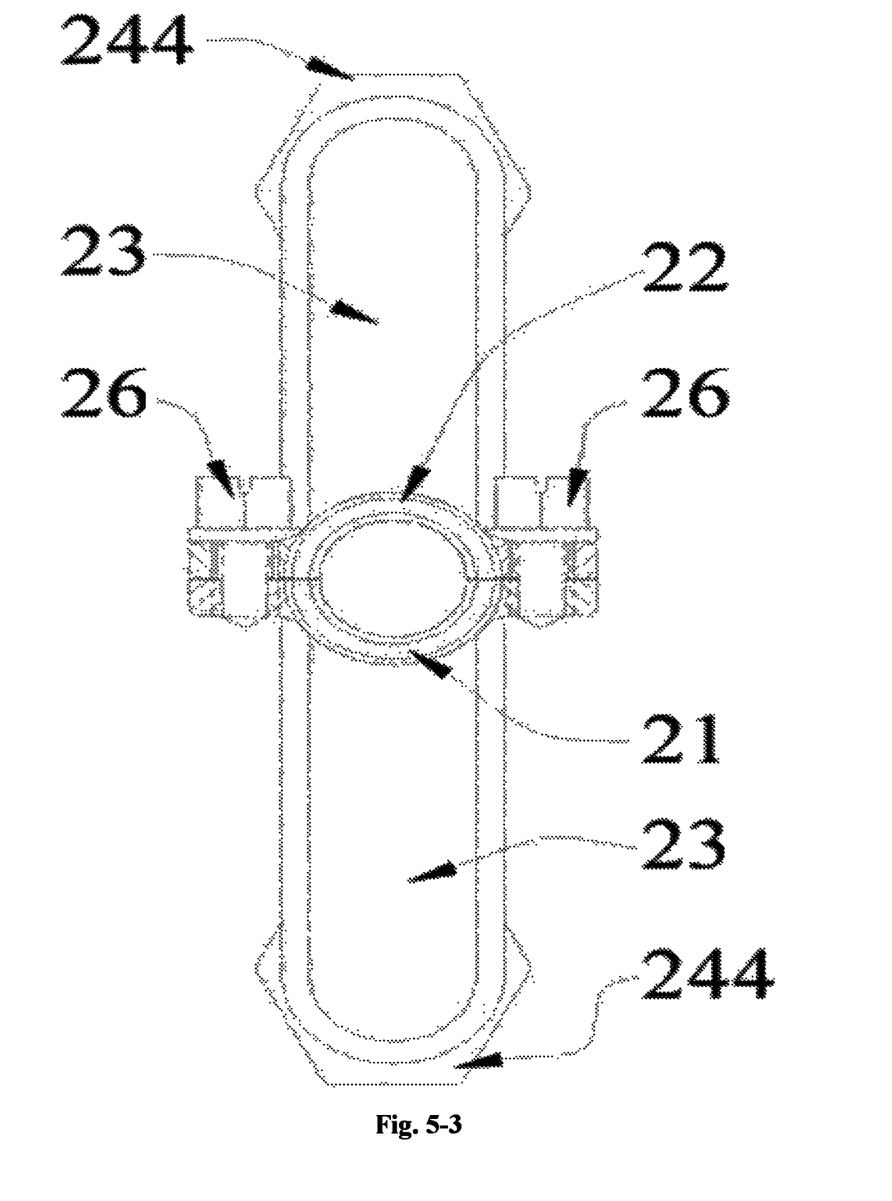

The optical unit leading-out connector 2 is provided with a base 21, an upper cover 22, a leading-out pipe 23 and an insulating sealing assembly 24, a triangular reinforcing part 25 is connected between the base 21 and the leading-out pipe 23, and the base 21, the leading-out pipe 23 and the triangular reinforcing part 25 are integrated in one piece, wherein the base 21 is of a special-shaped pipe body provided with a cover opening 21a and a leading-out hole 21b, the base 21 is divided into a recombination section D1, a separation section D2 of about 8 cm and a recovery section D3 in sequence in the axial direction, the cover opening 21a is provided at the pipe wall top of the base 21, penetrates through the recombination section D1 and the separation section D2 and covers part of the recovery section D3, the leading-out hole 21b is provided at the pipe wall bottom of the base 21 and is located in the separation section D2, the leading-out pipe 23 is of a special-shaped pipe body provided with a different-diameter pipe chamber, the different-diameter pipe chamber is formed by connecting a first pipe chamber 23a, a second pipe chamber 23b and a third pipe chamber 23c in sequence, the first pipe chamber 23a is a frustum-shaped pipe chamber of which the pipe diameter decreases gradually in the axial direction from the first pipe chamber 23a to the third pipe chamber 23c, the second pipe chamber 23b is a hemispherical pipe chamber, external threads 231 are provided at the end of the leading-out pipe 23 located at one side of the third pipe chamber 23c, the insulating sealing assembly 24 is provided with a spherical sealing washer 241, an insulating sheath 242, a reinforcing sleeve 243 and a tightening nut 244, the insulating sheath 242 is of a variable-diameter pipe body provided with a hemispherical pipe chamber 242a and a main pipe chamber 242b and formed by connecting a large-diameter pipe part 2421 and a small-diameter pipe part 2422, the hemispherical pipe chamber 242a is located at the end of the large-diameter pipe part 2421, the main pipe chamber 242b penetrates through the small-diameter pipe part 2422 and is connected to the hemispherical pipe chamber 242a, an external wall of the reinforcing sleeve 243 located at one end is provided with an external lug boss 2431, an internal wall of the tightening nut 244 located at one end is provided with an internal lug boss 2441; and the leading-out pipe 23 is connected to the base 21, so that the first pipe chamber 23a of the leading-out pipe 23 is in communication with the pipe chamber of the base 21 through the leading-out hole 21b, and the leading-out pipe 23 in the axial direction from the first pipe chamber 23a to the third pipe chamber 23c makes an acute included angle with the leading-out pipe 23 in the axial direction from the recombination section tD1 to the recovery section D3.

The optical fiber cable section of the OPPC optical fiber cable 1 located at the tail is divided into a reservation strand 14 and the plastic-pipe optical unit 11 by stripping an external layer strand covering the plastic-pipe optical unit 11, and the cut end of the reservation strand 14 is formed into strand section with a length of ΔL greater than the length sum of the separation section D2 and the recovery section D3, where ΔL is between 1 cm and 2 cm.

The separated plastic-pipe optical unit 11 stretches into the different-diameter pipe chamber of the leading-out pipe 23 through the leading-out hole 21b, the reservation strand penetrates into the pipe chamber of the base 21, and the end with the length of ΔL of the recovery section cable stretches out of the base, so that the left end of the reservation strand 14 is located on the separation section D2, then at the ΔL end, a soft aluminum pipe of which the external diameter corresponds to the pipe chamber and the internal diameter corresponds to the reservation strand and the left space is sleeved, and the space left by the recovery section is filled to form a complete recovery section cable. Moreover, the end of the base located at one side of the recovery section is tightly pressed on the recovery section cable by a hydraulic clamp. The plastic-pipe optical unit 11 stretching into the different-diameter pipe chamber of the leading-out pipe 23 is led out by the insulating sealing assembly 24, and the upper cover 22 covers the cover opening 21a of the base 21 and is connected and fixed to the base 21 by bolts 26.

Wherein the plastic-pipe optical unit 11 stretching into the different-diameter pipe chamber of the leading-out pipe 23 is led out by the insulating sealing assembly 24 in the following installation mode: the spherical sealing washer 241 and the large-diameter pipe part 2421 of the insulating sheath 242 are installed in the second pipe chamber 23b and the third pipe chamber 23c of the leading-out pipe 23 in sequence, so that the spherical sealing washer 241 is located in a spherical chamber body formed by the second pipe chamber 23b of the leading-out pipe 23 and the hemispherical pipe chamber 242a of the insulating sheath 242 and the first pipe chamber 23a of the leading-out pipe 23 is in communication with the main pipe chamber 242b of the insulating sheath 242 through a central through hole of the spherical sealing washer 241; the plastic-pipe optical unit 11 stretching into the different-diameter pipe chamber of the leading-out pipe 23 penetrates through the central through hole of the spherical sealing washer 241 and the main pipe chamber 242b of the insulating sheath 242; the reinforcing sleeve 243 is sleeved on the small-diameter pipe part 2422 of the insulating sheath 242, and the external lug boss lug boss 2431 of the reinforcing sleeve 243 is located on the large-diameter pipe part 2421 of the insulating sheath 242; the tightening nut 244 is sleeved on the reinforcing sleeve 243 and is connected to the external threads 231 of the leading-out pipe 23, so that the internal lug boss 2441 of the tightening nut 244 tightly presses the spherical sealing washer 241 in the spherical chamber body formed by the second pipe chamber 23b of the leading-out pipe 23 and the hemispherical pipe chamber 242a of the insulating sheath 242 through the external lug boss 2431 of the reinforcing sleeve 243 and the large-diameter pipe part 2421 of the insulating sheath 242 in sequence, and enables the spherical sealing washer 241 to be tightly pressed on the plastic-pipe optical unit 11. Therefore, the outside moisture is prevented from entering an internal chamber of the optical unit leading-out connector 2 using the spherical sealing washer 241. In addition, for a 10 Kv line, the purpose of fusing or terminating on the ground may be achieved by reserving 15 m of the plastic-pipe optical unit 11 led out by the insulating sealing assembly 24, wherein the plastic-pipe optical unit 11 led out by the insulating sealing assembly 24, i.e. the plastic-pipe optical unit 11 stretches into the different-diameter pipe chamber of the leading-out pipe 23 and then penetrates through the central through hole of the spherical sealing washer 241 and the main pipe chamber 242b of the insulating sheath 242.

The OPPC optical fiber cable 1 leaves a residual cable section 16 for maintenance between the installation position of the preformed armor rod assembly 3 and the installation position of the optical unit leading-out connector 2, the residual cable section 16 being coiled on the residual cable rack 5 through the lugs 53.

A construction method for a structure for directly leading down optical unit of OPPC optical fiber cable comprises:

Step 1. on the ground, connecting the OPPC optical fiber cable 1 to the optical unit leading-out connector 2, comprising:

Step 1-1. making the optical fiber cable section of the OPPC optical fiber cable 1 located at the tail into the reservation strand 14, the recovery section cable 15 and the separated plastic-pipe optical unit 11;

Step 1-2. penetrating the reservation strand 14 and the recovery section cable 15 into the pipe chamber of the base 21 and stretching the separated plastic-pipe optical unit 11 into the different-diameter pipe chamber of the leading-out pipe 23 first, then enabling the upper cover 22 to cover the cover opening 21a of the base 21, and tightly pressing the end of the base 21 located at one side of the recovery section D3 on the recovery section cable 15 using a hydraulic clamp;

Step 1-3. leading out the plastic-pipe optical unit 11 stretching into the different-diameter pipe chamber of the leading-out pipe 23 by the insulating sealing assembly 24, and temporarily coiling the plastic-pipe optical unit 11 led out by the insulating sealing assembly 24, wherein the plastic-pipe optical unit 11 led out by the insulating sealing assembly 24, i.e. the plastic-pipe optical unit 11 stretches into the different-diameter pipe chamber of the leading-out pipe 23 and then penetrates through the central through hole of the spherical sealing washer 241 and the main pipe chamber 242b of the insulating sheath 242;

Step 2. on the ground, installing the preformed armor rod assembly 3 and the electric connection jumper 8 on the OPPC optical fiber cable 1, wherein the OPPC optical fiber cable 1 leaves a residual cable section 16 for maintenance between the installation position of the preformed armor rod assembly 3 and the installation position of the optical unit leading-out connector 2;

Step 3. on the ground, connecting the preformed armor rod assembly 3 to one end of the insulator string 7 through the first link fitting 4, the residual cable rack 5 and the second link fitting 6 in sequence, and coiling the residual cable section 16 on the residual cable rack 5;

Step 4. slinging the other end of the insulator string 7 and connecting same to a cross arm of a pylon or a telegraph pole, to pull the OPPC optical fiber cable 1, the preformed armor rod assembly 3, the first link fitting 4, the residual cable rack 5, the second link fitting 6, the insulator string 7 and the electric connection jumper 8 into the air; and Step 5. uncoiling the temporarily coiled plastic-pipe optical unit 11 and fixing same to the pylon or the telegraph pole, to directly lead down the plastic-pipe optical unit 11 of the OPPC optical fiber cable 1.

Embodiment 2

Figure 6:
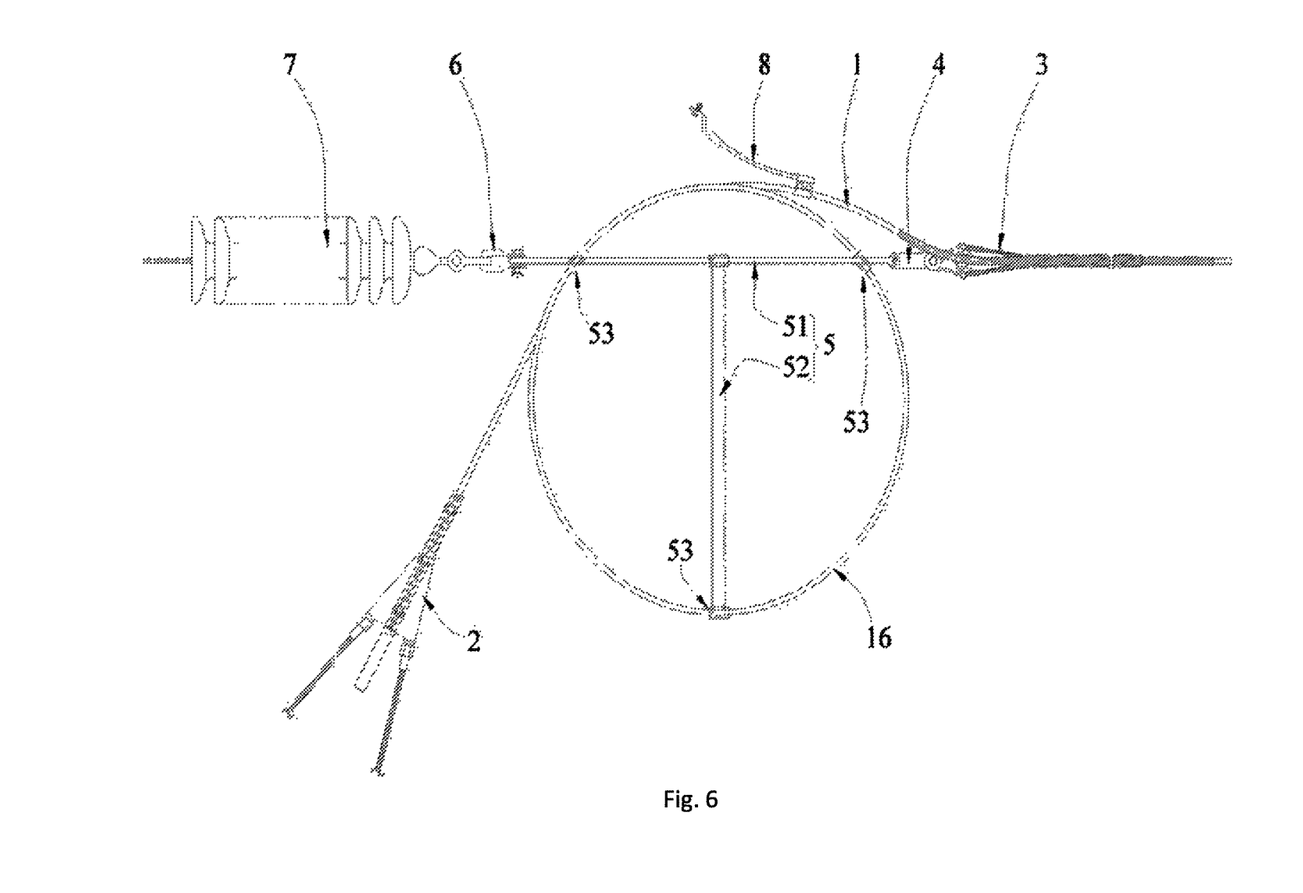
FIG. 6 is a structural schematic diagram showing a main section of an optical unit leading-out connector installed on an OPPC optical fiber cable of embodiment 2 of the present invention.
Figure 7:
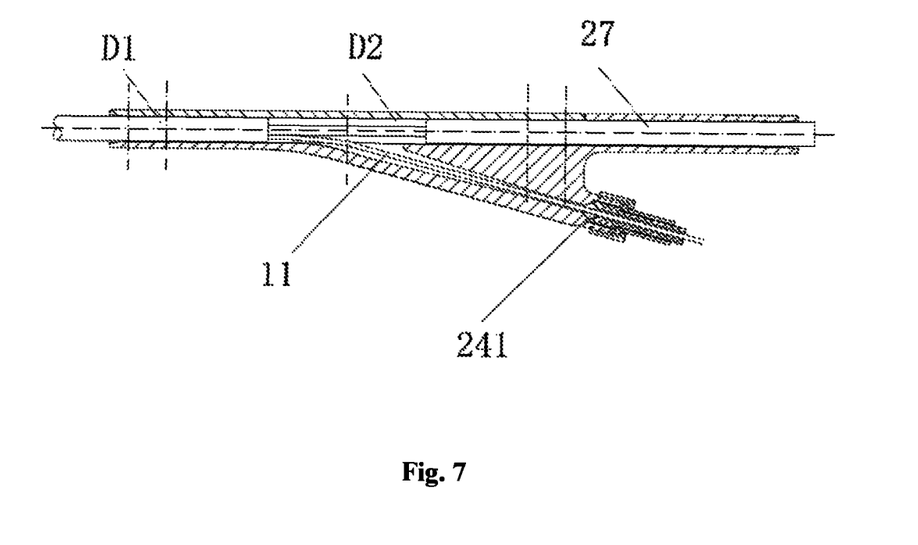
FIG. 7 is a structural schematic diagram showing a recovery section sleeved in a soft aluminum pipe of the present invention.

As shown in FIG. 5-1 to FIG. 6, the structure for directly leading down optical units in embodiment 2 is substantially identical to that in embodiment 1, and is different from it in that: in embodiment 2, the optical unit leading-out connector 2 is provided with two leading-out pipes 23 and two insulating sealing assemblies 24, the upper cover 22 is provided with an upper cover leading-out hole 22a, and the upper cover leading-out hole 22a is located in the recombination section D1 when the upper cover 22 covers the cover opening 21a of the base 21; the first leading-out pipe 23 is connected to the base 21, so that the first pipe chamber 23a of the first leading-out pipe 23 is in communication with the pipe chamber of the base 21 through the leading-out hole 21b, and the second leading-out pipe 23 is connected to the external wall of the upper cover 22, so that the first pipe chamber 23a of the second leading-out pipe 23 is in communication with the pipe chamber of the base 21 through the upper cover leading-out hole 22a. Moreover, the OPPC optical fiber cable 1 is provided with two plastic-pipe optical units 11; the two plastic-pipe optical units are both separated from the reservation strand 14 by stripping the external layer strand, the first separated plastic-pipe optical unit 11 stretches into the different-diameter pipe chamber of the leading-out pipe 23 connected to the base 21 through the leading-out hole 21b and is led out by the first insulating sealing assembly 24, and the second separated plastic-pipe optical unit 11 stretches into the different-diameter pipe chamber of the leading-out pipe 23 connected to the upper cover 22 through the upper cover leading-out hole 22a and is led out by the second insulating sealing assembly 24.

The construction method for the structure for directly leading down optical units in embodiment 2 is identical to that in embodiment 1, which will not be described in detail herein.

The present invention is not limited to the above embodiments. According to the above content and in accordance with ordinary technical knowledge and frequently-used means in the art, other various equivalent modifications, replacements or alterations can also be made without departing from the basic technical idea of the present invention. These modifications, replacements and alterations are all fallen within the protective scope of the present invention.

What is claimed is:

1. A structure for directly leading down optical units of an OPPC optical fiber cable, provided with an OPPC optical fiber cable, a preformed armor rod assembly, a first link fitting, a second link fitting, an insulator string and an electric connection jumper;

wherein the preformed armor rod assembly is installed on the OPPC optical fiber cable, the preformed armor rod assembly is connected to one end of the insulator string through the first link fitting and the second link fitting in sequence, the other end of the insulator string is connected to a cross array of a pylon or a telegraph pole; and the electric connection jumper is installed on the OPPC optical fiber cable, wherein the OPPC optical fiber cable is formed by intertwisting a plastic-pipe optical unit, a plurality of steel wires and a plurality of aluminum wires; and characterized by being further provided with an optical unit leading-out connector; the optical unit leading-out connector is provided with a base, an upper cover, a leading-out pipe and an insulating sealing assembly;

wherein the base is provided with a cover opening and a leading-out hole, the base is divided into a recombination section, a separation section and a recovery section in sequence in the axial direction, the cover opening is provided at the pipe wall top of the base, penetrates through the recombination section and the separation section and covers part of the recovery section, the leading-out hole is provided at the pipe all bottom of the base and is located in the separation section, the leading-out pipe is provided with a tapered pipe chamber, the tapered pipe chamber is formed by connecting a first pipe chamber, a second pipe chamber and a third pipe chamber in sequence, the second pipe chamber is a hemispherical pipe chamber, external threads are provided at the end of the leading-out pipe located at one side of the third pipe chamber, the insulating sealing assembly is provided with a spherical sealing washer, an insulating sheath, a reinforcing sleeve and a tightening nut, the insulating sheath is of a variable-diameter pipe body provided with a hemispherical pipe chamber and a main pipe chamber and formed by connecting a first pipe part and a second pipe part, the hemispherical pipe chamber is located at the end of the first pipe part, the main pipe chamber penetrates through the second pipe part and is connected to the hemispherical pipe chamber, an external wall of the reinforcing sleeve located at one end is provided with an external lug boss, an internal wall of the tightening nut located at one end is provided with an internal lug boss; and the leading-out pipe is connected to the base, so that the first pipe chamber is in communication with the pipe chamber of the base through the leading-out hole; an optical fiber cable section of the OPPC optical fiber cable located at the tail is divided into a reservation strand and the plastic-pipe optical unit by stripping an external layer strand covering the plastic-pipe optical unit, and the cut end of the reservation strand is formed into a strand section with a length of ΔL greater than the length sum of the separation section and the recovery section, where ΔL is between 1 cm and 2 cm; the separated plastic-pipe optical unit stretches into the tapered pipe chamber of the leading-out pipe through the leading-out hole, the reservation strand penetrates into the pipe chamber of the base and is located at the recovery section, and the end with the length of ΔL stretches out of the base, so that the left end of the reservation strand is located on the separation section, at this moment, at the ΔL end, a flexible aluminum pipe of which the external diameter corresponds to the pipe chamber and the internal diameter corresponds to the reserve strand is sleeved, a space left by the recovery section is filled to form a complete recovery section, then, the base is tightly pressed on a recovery section cable by a hydraulic clamp, the plastic-pipe optical unit stretching into the tapered pipe chamber of the leading-out pipe is led out by the insulating sealing assembly, and the upper cover covers the cover opening; wherein the plastic-pipe optical unit stretching into the tapered pipe chamber of the leading-out pipe is led out by the insulating sealing assembly in the following installation mode: the spherical sealing washer and the first pipe part of the insulating sheath are installed in the second pipe chamber and the third pipe chamber in sequence, so that the spherical sealing washer is located in a spherical chamber body formed by the second pipe chamber and the hemispherical pipe chamber and the first pipe chamber is in communication with the main pipe chamber through a central through hole of the spherical sealing washer; the plastic-pipe optical unit stretching into the tapered pipe chamber of the leading-out pipe penetrates through the central through hole of the spherical sealing washer and the main pipe chamber; the reinforcing sleeve is sleeved on the second pipe part, and the external lug boss is located on the first pipe part; the tightening nut is sleeved on the reinforcing sleeve and is connected to the external threads, so that the internal lug boss tightly presses the spherical sealing washer in the spherical chamber body formed by the second pipe chamber and the hemispherical pipe chamber of the insulating sheath through the external lug boss and the first pipe part in sequence, and enables the spherical sealing washer to be tightly pressed on the plastic-pipe optical unit; and the first pipe part has a larger diameter than that of the second pipe part.

2. The structure for directly leading down optical units according to claim 1, characterized in that the OPPC optical fiber cable is provided with two plastic-pipe optical units; the optical unit leading-out connector is provided with two leading-out pipes and two insulating sealing assemblies, the upper cover is provided with an upper cover leading-out hole, and the upper cover leading-out hole is located in the recombination section when the upper cover covers the cover opening; the first leading-out pipe is connected to the base, so that the first pipe chamber of the first leading-out pipe is in communication with the pipe chamber of the base through the leading-out hole, the second leading-out pipe is connected to the external wall of the upper cover, so that the first pipe chamber of the second leading-out pipe is in communication with the pipe chamber of the base through the upper cover leading-out hole; the two plastic-pipe optical units are both separated from the reservation strand by stripping the external layer strand, the first separated plastic-pipe optical unit stretches into the tapered pipe chamber of the leading-out pipe connected to the base through the leading-out hole and is led out by the first insulating sealing assembly, and the second separated plastic-pipe optical unit stretches into the tapered pipe chamber of the leading-out pipe connected to the upper cover through the upper cover leading-out hole and is led out by the second insulating sealing assembly.

3. The structure for directly leading down optical units according to claim 1, characterized in that the leading-out pipe in the axial direction from the first pipe chamber to the third pipe chamber makes an acute included angle with the leading-out pipe in the axial direction from the recombination section to the recovery section.

4. The structure for directly leading down optical units according to claim 3, characterized in that the first pipe chamber is a frustum-shaped pipe chamber of which the pipe diameter gradually decreases in the axial direction from the first pipe chamber to the third pipe chamber.

5. The structure for directly leading down optical units according to claim 3, characterized in that a triangular reinforcing part is connected between the base and the leading-out pipe, and the base, the leading-out pipe and the triangular reinforcing part are integrated in one piece.

6. The structure for directly leading down optical units according to claim 1, characterized in that the upper cover covering the cover opening is connected and fixed to the base by bolts.

7. The structure for directly leading down optical units according to claim 1, characterized in that the OPPC optical fiber cable leaves a residual cable section for maintenance between the installation position of the preformed armor rod assembly and the installation position of the optical unit leading-out connector; the structure for directly leading down optical units is further provided with a residual cable rack; the residual cable rack is connected between the first link fitting and the second link fitting; and the residual cable section is coiled on the residual cable rack.

8. The structure for directly leading down optical units according to claim 7, characterized in that the residual cable rack is composed of a horizontal pull rod and a vertical pull rod of which the upper end is fixed to the middle part of the horizontal pull rod, the horizontal pull rod and the vertical pull rod are provided with lugs respectively, the horizontal pull rod is connected between the first link fitting and the second link fitting, and the residual cable section is coiled on the residual cable rack through the lugs.

9. A construction method for a structure for directly leading down optical units of an OPPC optical fiber cable, characterized in that the structure for directly leading down optical units is the structure for directly leading down optical units of claim 7, and the construction method comprising:
- step 1. on the around, connecting the OPPC optical fiber cable to the optical unit leading-out connector, comprising:
- step 1-1. making the optical fiber cable section of the OPPC optical fiber cable located at the tail into the reservation strand, an unrecovered section cable of the recovery section cable and the separated plastic-pipe optical unit;
- step 1-2. stretching the separated plastic-pipe optical unit into the tapered pipe chamber of the leading-out pipe first, penetrating the reservation strand into the pipe chamber of the base, sleeving a flexible aluminum pipe for filling the space to form the cable of the complete recovery section, enabling the upper cover to cover the cover opening of the base, and tightly pressing the end of the base located at one side of the recovery section on the recovery section cable using a hydraulic clamp;
- step 1-3. leading out the plastic-pipe optical unit stretching into the tapered pipe chamber of the leading-out pipe by the insulating sealing assembly, and temporarily coiling the plastic-pipe optical unit led out by the insulating sealing assembly, wherein the plastic-pipe optical unit led out by the insulating sealing assembly stretches into the tapered pipe chamber of the leading-out pipe and then penetrates through the central through hole of the spherical sealing washer and the main pipe chamber of the insulating sheath;
- step 2. on the ground, installing the preformed armor rod assembly and the electric connection jumper on the OPPC optical fiber cable, wherein the OPPC optical fiber cable leaves a residual cable section for maintenance between the installation position of the preformed armor rod assembly and the installation position of the optical unit leading-out connector;
- step 3. on the ground, connecting the preformed armor rod assembly to one end of the insulator string through the first link fitting, the residual cable rack and the second link fitting in sequence, and coiling the residual cable section on the residual cable rack;
- step 4. slinging the other end of the insulator string and connecting same to a cross arm of a pylon or a telegraph pole, to pull the OPPC optical fiber cable, the preformed armor rod assembly, the first link fitting, the residual cable rack, the second link fitting, the insulator string and the electric connection jumper into the air; and
- step 5. uncoiling the temporarily coiled plastic-pipe optical unit and fixing same to the pylon or the telegraph pole, to directly lead down the plastic-pipe optical unit of the OPPC optical fiber cable.

* * * * *